US012081027B2

(12) United States Patent
Menendez et al.

(10) Patent No.: US 12,081,027 B2
(45) Date of Patent: Sep. 3, 2024

(54) SYSTEMS AND METHODS FOR ENERGY STORAGE AND MANAGEMENT

(71) Applicant: Blue Planet Energy, Honolulu, HI (US)

(72) Inventors: Michael Menendez, Honolulu, HI (US); Sterling Gascon, Honolulu, HI (US)

(73) Assignee: Blue Planet Energy, Honolulu, HI (US)

( * ) Notice: Subject to any disclaimer, the term of this patent is extended or adjusted under 35 U.S.C. 154(b) by 43 days.

(21) Appl. No.: 17/801,952

(22) PCT Filed: Feb. 26, 2021

(86) PCT No.: PCT/US2021/019865
§ 371 (c)(1),
(2) Date: Aug. 24, 2022

(87) PCT Pub. No.: WO2021/173966
PCT Pub. Date: Sep. 2, 2021

(65) Prior Publication Data
US 2023/0106851 A1   Apr. 6, 2023

Related U.S. Application Data

(60) Provisional application No. 62/981,652, filed on Feb. 26, 2020.

(51) Int. Cl.
*H02J 3/32*     (2006.01)
*H01M 10/42*    (2006.01)
(Continued)

(52) U.S. Cl.
CPC ............. *H02J 3/32* (2013.01); *H01M 10/425* (2013.01); *H01M 10/46* (2013.01);
(Continued)

(58) Field of Classification Search
CPC ......................................................... H02J 3/32
(Continued)

(56) References Cited

U.S. PATENT DOCUMENTS

2014/0336834 A1* 11/2014 Sanders ................. G05B 15/02
700/295
2017/0279170 A1   9/2017 O'Hora
(Continued)

OTHER PUBLICATIONS

ISR PCT/US2021/019865, dated May 20, 2021 (3 pages).
EP Search Report 21 76 1304 dated Apr. 3, 2024 (6 pages).

*Primary Examiner* — Joseph Chang
(74) *Attorney, Agent, or Firm* — White & Case LLP (57) ABSTRACT

An energy storage system (ESS) including a battery management system (BMS) arranged to monitor and control operations associated with charging and discharging electrical current from a storage element where the BMS is positioned within a cavity of a housing. A site controller coordinates operations of the ESS with a component of a power distribution system where the site controller is positioned within the housing's cavity. The storage element may include one or more battery cells. The ESS may include a frame defining the housing's cavity and including first and second side panels and a front access panel. The access panel may include at least one hinge in proximity to the first side panel where the hinge is arranged to prevent a portion of the hinge from extending beyond an edge of the first side panel as the access panel rotates from a closed position to an open position.

20 Claims, 9 Drawing Sheets

(51) Int. Cl.
*H01M 10/46* (2006.01)
*H02J 7/00* (2006.01)
*H02J 13/00* (2006.01)
*H02J 3/38* (2006.01)

(52) U.S. Cl.
CPC .......... *H02J 7/0013* (2013.01); *H02J 7/0047* (2013.01); *H02J 7/007* (2013.01); *H02J 13/00004* (2020.01); *H01M 2010/4271* (2013.01); *H01M 2010/4278* (2013.01); *H01M 10/465* (2013.01); *H01M 2220/10* (2013.01); *H02J 3/381* (2013.01); *H02J 2207/20* (2020.01); *H02J 2300/22* (2020.01); *H02J 2310/12* (2020.01)

(58) Field of Classification Search
USPC .......................................................... 307/24
See application file for complete search history.

(56) References Cited

U.S. PATENT DOCUMENTS

| | | |
|---|---|---|
| 2017/0292305 A1 | 10/2017 | Geissenhoener et al. |
| 2019/0103639 A1 | 4/2019 | Guglielmo et al. |

* cited by examiner

SYSTEMS AND METHODS FOR ENERGY STORAGE AND MANAGEMENT

CROSS-REFERENCE TO RELATED APPLICATIONS

This application is a national stage filing under 35 U.S.C. § 371 of International Application No. PCT/US2021/019865, filed on Feb. 26, 2021, which claims the benefit of and priority to U.S. Provisional Application No. 62/981,652, filed on Feb. 26, 2020. The specifications of the foregoing applications are incorporated herein by reference in their entirety.

FIELD OF THE INVENTION

The invention relates generally to systems and methods for operating an energy storage system. More particularly, in various aspects, the invention relates to implementing more scalable, adaptable, and resilient energy storage systems.

INTRODUCTION

As solar power panels and arrays have become more readily available and affordable, power management systems have emerged that enable consumers and businesses to collect and store electrical power for off-grid consumption. For instance, the Tesla® Powerwall® and Powerpack® are examples of Lithium-ion battery storage systems that interface with solar panels arrays and provide power for consumer homes and businesses respectively. Powerwall® systems typically provide about 2 kW-7 kW continuous power. Multiple Powerwall® systems can be connected together to expand system capacity. Powerpack® systems typically provide 100 kWh-210 kWh capacity. The Tesla® systems, like other power systems, use proprietary technology to implement battery cell packaging, arrangement, and cooling. Other energy storage companies such as Enphase Energy, LG Chem, and BYD Co LTD are developing proprietary energy storage systems for consumer and commercial uses.

Unfortunately, these various existing energy storage systems rely on proprietary technologies that are not compatible with each other and, therefore, not efficiently serviceable, upgradable, or maintainable. While these systems have some degree of scalability, they lack sufficient intelligence and modularity to enable more efficient expansion, adaptability, and resiliency of over time. Accordingly, there is a need for a more configurable and modular energy storage system that enables improved scalability while being more resilient to changing demands of system users over time.

SUMMARY

The present disclosure addresses the deficiencies of existing power management systems by describing systems, methods, and devices that enable more efficient, scalable, and resilient power management using non-proprietary modular elements that enable more efficient and less costly maintenance, operation, and expansion of energy storage.

Existing energy storage systems from different companies utilize custom packaging, custom system configurations, proprietary battery architectures and arrangements, and custom inverter designs, resulting in a disparate selection of energy storage systems that are less efficient and more costly to maintain and update. In contrast, the methods and systems disclosed herein provide a technology-agnostic architecture capable of handling different battery technologies and form factors, using standard, yet flexible and modular housing structures. Ultimately, the methods and systems described herein implement future-proof and resilient energy storage technology. More specifically, the present energy storage system includes a housing unit having configurable shelfs and/or racks that are adjustable to support multiple battery form factors or technologies. The housing unit and/or enclosure may also be configured to support elements of an energy storage system (ESS) including, without limitation, a battery management system (BMS), site controller (SC), AC/DC converter, DC/AC inverter, sensors, cooling system elements, and so on.

The ESS housing unit may include a user interface. The user interface may include a display screen, keypad, touch screen, and/or one or more LED indicators. In some implementations, the housing unit has one or more user interface elements that are detachably connectable to allow removal of certain elements and, thereby, provide a more streamlined housing unit. The housing unit and/or enclosure may be configured to provide a robust structure to securely house various components of the ESS. The housing unit structure may be constructed of steel, aluminum, titanium, composite materials, a combination thereof, and the like.

Depending on the components within a housing unit, the front access door and/or access panel may include a user interface (i.e., when the housing unit includes a site controller) or no user interface when, for example, the housing unit holds auxiliary batteries. A housing unit may include a cooling system and/or air filtration system. A housing unit may include an air inlet with air filter, a fan, and an air outlet. In some implementations, the air inlet is located in a lower location of the housing unit while an air outlet is positioned at or near the top of a housing unit. An exhaust and/or cooling fan may be positioned at or near the air outlet. A housing unit may include one or more sensors configured to sense, for example, temperature within the housing unit, temperature within one or more battery cells, air flow at the inlet or outlet of the housing unit, current to or from one or more battery cells, voltage at one or more battery cells, and so on.

The access panel may include a one or more hinges arranged to prevent the access panel from extending laterally beyond an edge and/or side of the housing unit. In this way, a first housing unit may be positioned adjacent to a second housing unit in a more compact manner without the second housing unit interfering with the opening of the access panel of the first housing unit. Hence, multiple housing units can be more compactly arranged adjacently, allowing for improved energy density of the ESS because more energy storage elements, e.g., batteries, can be located within a particular location. An access panel may be connect to or removed from a housing unit. An access panel may include a user interface, e.g., a touch screen.

In some implementations, the SC in a first housing unit may have or interface with a transceiver to enable the SC to communication with a BMS and/or SC of a second housing unit or other housing units. The SC may communication directly via a communications link and/or cable. The SC may communicate via a data network with one or more BMSs or SCs of other housing units or with a remote server. In some implementations, a remote server may communication via a network with one or more ESSs. The remote server may enable remote monitoring and/or maintenance, e.g., implement software updates, of one or more ESSs.

A housing unit may include a disconnect switch to connect or disconnect the power units and/or storage elements, e.g., batteries, from an electrical circuit formed with another housing unit. For example, a first (master) housing unit may include a BMS and SC, which is electronically connected to a second housing unit including auxiliary batteries that is also connected to a third housing unit including auxiliary batteries. Each of the first, second, and third housing units may include a first, second, and third battery bank respectively where all of which are connected in parallel to provide, for example, 48 volts DC (vDC). If maintenance is required for the second battery bank, a disconnect switch in the second housing unit can be opened to remove the second battery bank from the overall battery circuit, while allowing the first battery bank and third battery bank to remain connected. In this way, maintenance, battery replacement, and/or upgrades may be performed in a modular manner without interrupting the overall operation of the ESS.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

The systems, methods, and devices described herein provide more efficient, scalable, and resilient power management using non-proprietary modular elements that enable more efficient and less costly maintenance, operation, and expansion of energy storage as the needs of users may change over time.

Figure 1:
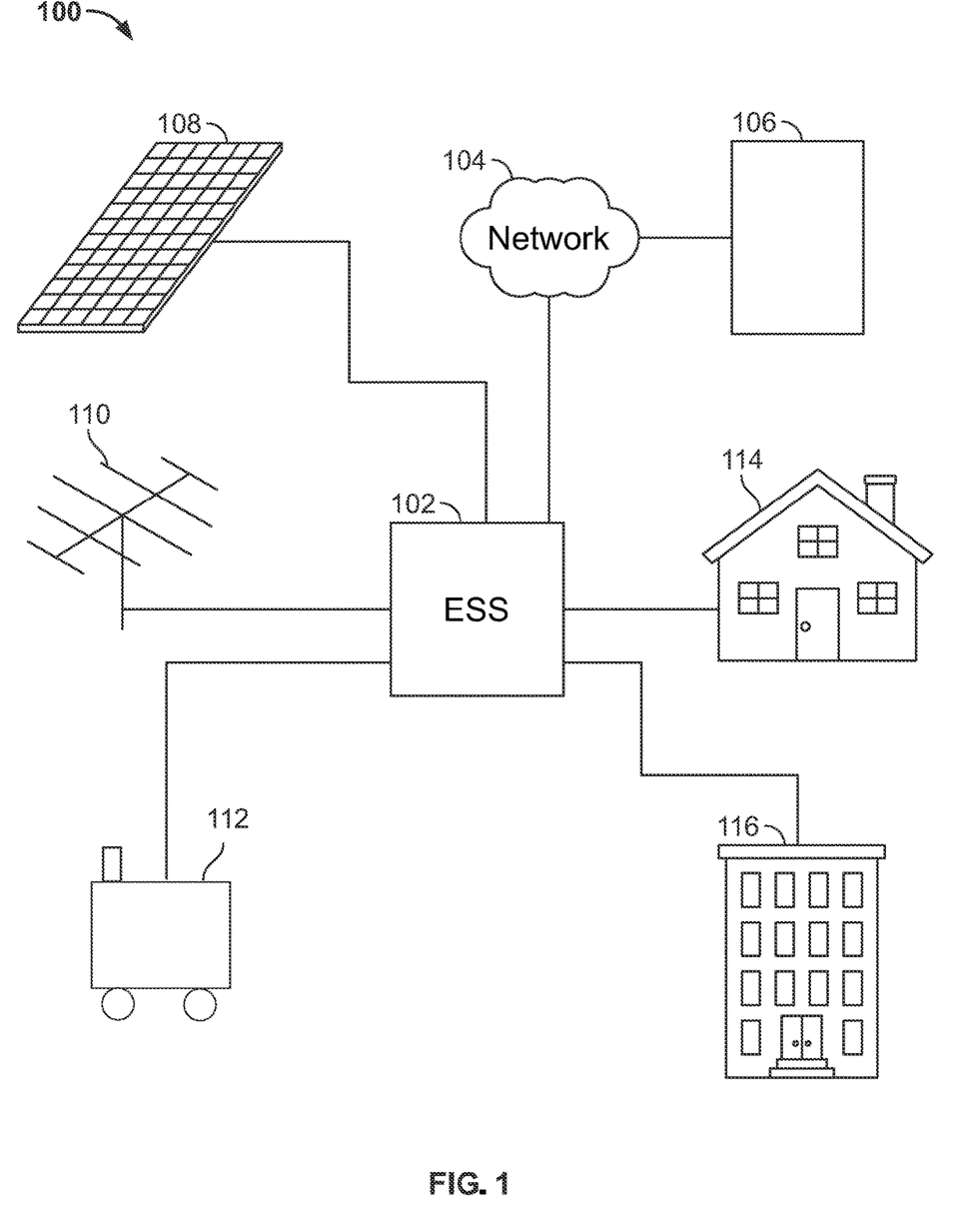
FIG. 1 shows a schematic representation of energy network including an energy storage system.

FIG. 1 shows a schematic representation of a power distribution system 100 including an ESS 102, network 104, remote server 106, solar array 108, utility power 110, electric power generator 112, consumer home 114, and commercial or government facility 116. The EES 102 may include one or more housing units as will be discussed in more detail later herein. The ESS 102 may interface with a remote server 106 via data network 104. Data network 104 may include a wireless and/or wired network, including portions of the Internet. The ESS 102 may receive power from one or more power sources such as, without limitation, solar array 108, utility power 110, and/or electric power generator 112. The ESS 102 may store the electrical energy in one or more housing units including one or more energy storage elements, e.g. one or more Lithium-ion DC batteries via an AC/DC converter that converts AC voltage and current from the generator 112 and/or utility power 110 to DC voltage and current. The ESS 102 may receive DC voltage and current from, for example, the solar array 108 and store the DC voltage and current and/or power in its storage elements. The ESS 102 may use a BMS to regulate the charging current rate from an AC and/or DC power source. The BMS may monitor various parameters of energy storage elements such as, without limitation, voltage, current, temperature, chemistry, and the like, while adjusting charging and/or discharging rates in response to detected parameters of the ESS 102.

Network 104 represents a network of internet-based devices and connections such as servers, storage, and applications. Server 106 may be a server and the receiver of input data from ESS 102, as well as data structures from network 104. Server 106 may also transmit signals and/or commands to ESS 102. In one aspect, server 106 transmits signals to ESS 102 to enable operation of the ESS 102. Server 106 may include non-volatile storage that can maintain data for long periods of time and may comprise hard disks, optical disks, solid-state drives (SSDs), or another type of non-volatile memory. Server 106 may also include databases with accessible data structures that comprise information corresponding to locations of one or more ESSs. Server 106 may include a web server configured to receive inputs from entities using a user interface. Server 106 is further described in the description of FIG. 3 below. In some implementations, a portion of the data stored within ESS 102 may be stored within a memory and/or datastore of server 106.

The communication between network 104 and ESS 102 can be achieved using Wi-Fi and/or a public land mobile network (PLMN). Wi-Fi may be implemented using a router that connects with ESS 102 using a wireless local area network using IEEE 802.11 standards. Wi-Fi may be located on or in a structure (e.g., a house or building) and allows ESS 102 to communicate with network 104 within the range of the wireless local area network surrounding the structure. As described further below, ESS 102 may transmit and receive data via Wi-Fi, wired connectivity, and/or a PLMN using an integrated transceiver.

Figure 2:
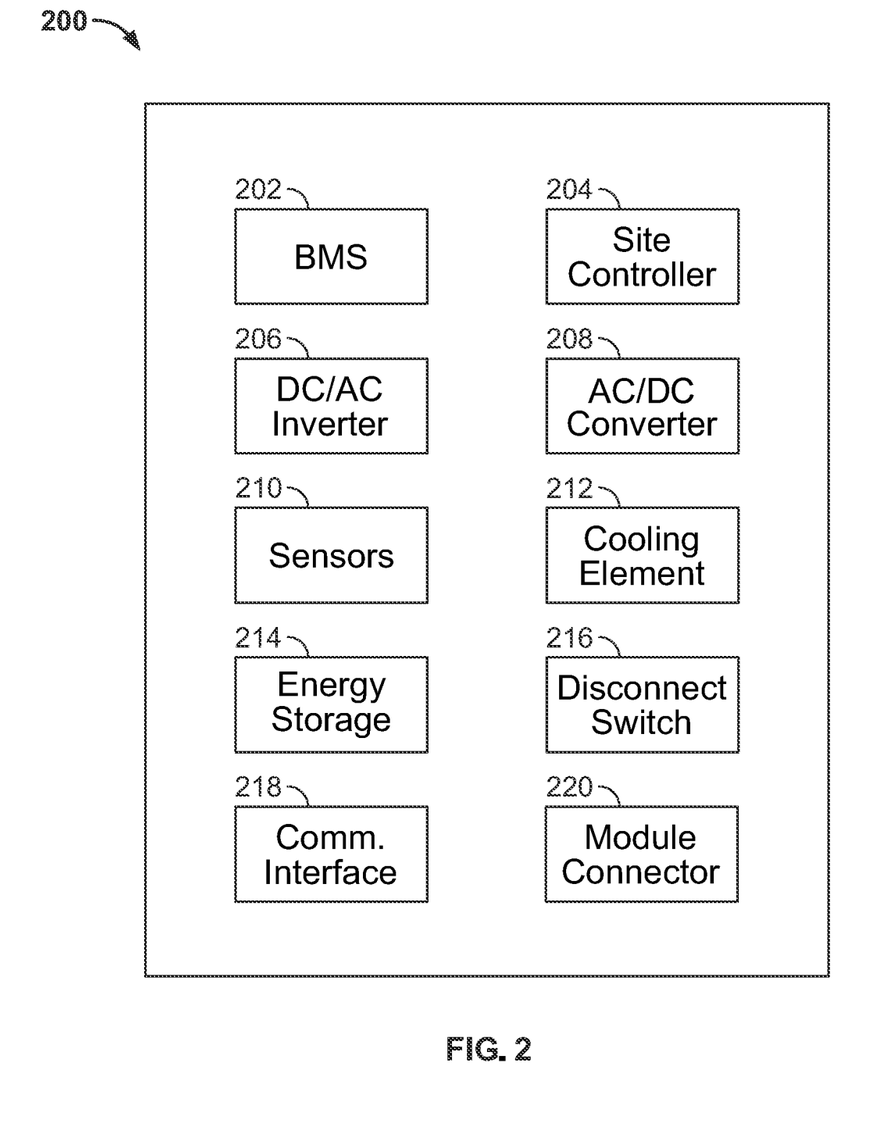
FIG. 2 shows a functional block diagram of an energy storage system of FIG. 1.

FIG. 2 shows a schematic representation of a housing unit and/or enclosure 200 of an ESS 102. Housing unit 200 includes BMS 202, SC 204, DC/AC inverter 206, AC/DC converter 208, sensors 210, cooling element 212, energy storage element 214, disconnect switch 216, communications interface 218, and module connector 220. BMS 202 and/or SC 204 may include a single microprocessor or multiple microprocessors such as processor 302 of FIG. 3. BMS 202 may monitor and/or control various operations of the ESS 102. For example, BMS 202 may monitor and/or regulate the charging rate to recharge energy storage element 214. BMS 202 may monitor and/or regulate the discharge rate from energy storage element 214. BMS 202 may control the operations of inverter 206 and/or converter 208 to control charge and/or discharge rates of ESS 102. BMS 202 may monitor voltage output from one or more battery cells of energy storage element 214. Energy storage element 214 may include one or more batteries of a type including Lithium Ferrous Phosphate (LFP), Lithium ion, AGM, lead acid, and so on. BMS 202 may interface with one or more sensors 210 to, for example, regulate charge rate, discharge rate, housing unit temperature, and so on. Sensor 210 may include a temperature sensor, current rate sensor, voltage sensor, hydrogen detector, and so on.

Site Controller (SC) 204 may facilitate communications with one or more housing units. SC 204 may interface via communications interface 218 with other systems to coordinate operations of the ESS 102 with such other systems. For example, SC 204 may monitor utility power available at the site where the ESS 102 and housing unit 200 are located. If SC 204 detects a loss of utility power, SC 204 may send a command to a site disconnect switch to transfer power from the utility source to the power outlet of ESS 102, effecting an automatic transfer of power to maintain power at the site supported by ESS 102. SC 204 may continue to monitor utility power and, if utility power is detected, then SC 204 may initiate a transfer of power back form ESS 102 to utility power by disconnecting the ESS 102 and connecting utility power back to the site. SC 204 may control connection and disconnection of one or more housing units from the housing unit 200. Communications interface 218 may include a transceiver that is capable of transmitting and receiving data signals via network 104 and/or directly with another housing unit via an electronic and/or fiber optic cable. Cooling element 212 may include an exhaust fan that, in response to sensor 210, e.g., including a temperature sensor, turns on and/or off to regulate housing unit 200 temperature. Disconnect switch 216 can connect or disconnect energy storage element 214 from one or more other energy storage elements within housing unit 200 or within other housing units in electrical communication with housing unit 200.

The housing unit 200 may include one or more module connectors 220 configured to enable housing unit 200 to connect mechanically and/or electronically with an adjacent housing unit. The module connector 220 may include one or more fasteners, latches, linkages, and the like to facilitate a physical connection between housing units. Module connector 220 may include one or more electrical connectors, plugs, and/or receptacles to enable one or more electronic connections between housing units.

Figure 3:
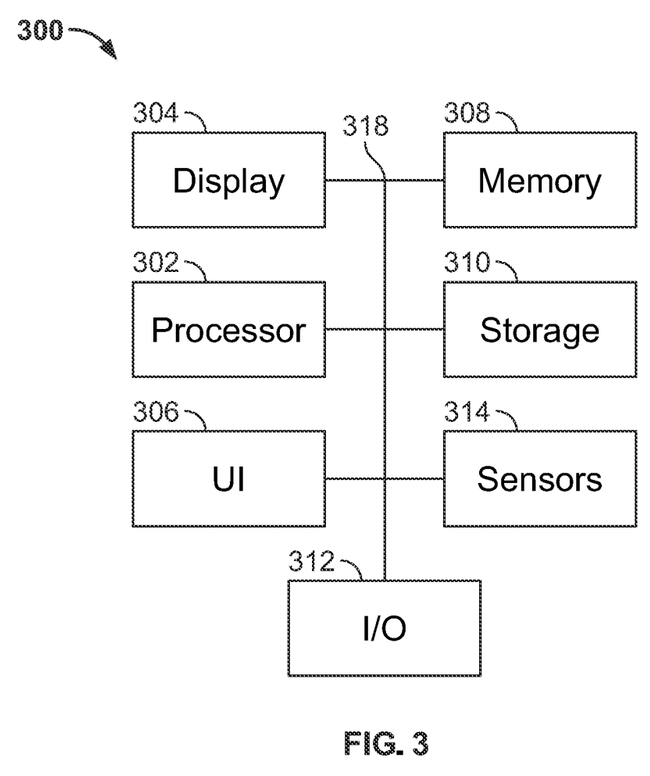
FIG. 3 shows a schematic representation of a computer capable of implementing various control functions of an energy storage system.

FIG. 3 includes a functional block diagram of a computer system, e.g., a computer, for performing the functions of the ESS 102 including, for example, functions of BMS 202, SC 204, and server 106. The exemplary computer system 300 includes a central processing unit (CPU) 302, display 304, user interface 306, a memory 308, storage 310, sensors 314, input/output interface 312, and an interconnect bus 318. The CPU 302 may include a single microprocessor or a plurality of microprocessors for configuring computer system 300 as a multi-processor system. The memory 308 illustratively includes a main memory and a read only memory. The computer 300 also includes the mass storage device 310 having, for example, various disk drives, solid-state drives, and so on. The main memory 308 also includes dynamic random access memory (DRAM) and high-speed cache memory. In operation, the main memory 308 stores at least portions of instructions and data for execution by the CPU 302.

The mass storage 310 may include one or more magnetic disk, solid state, and/or optical disk drives or memory sticks, for storing data and instructions for use by the CPU 302. At least one component of the mass storage system 310, preferably in the form of a disk drive or solid state drive, stores a database used for processing data associated with operation of ESS 102. The mass storage system 310 may also include one or more drives for various portable media, such as a floppy disk, flash drive, a compact disc read only memory (CD-ROM, DVD, CD-RW, and variants), or an integrated circuit non-volatile memory adapter (i.e. PC-MCIA adapter) to input and output data and code to and from the computer system 300.

The computer system 300 may also include one or more input/output interfaces for communications, shown by way of example, as interface 312 for data communications via, for example, network 104. The data interface 312 may be a modem, an Ethernet card or any other suitable data communications device. To provide the functions of ESS 102 according to FIGS. 1 and 2, the data interface 312 may provide a relatively high-speed link to a network 104, such as an intranet, internet, or the Internet, either directly or through another external interface. The communication link to the network 104 may be, for example, optical, wired, or wireless (e.g., via satellite, Wifi, or cellular network). Alternatively, the computer system 300 may include a mainframe or other type of host computer system capable of Web-based communications via the network 104. The computer system 300 may include software for operating a network application such as a web server and/or web client.

The computer system 300 may also include suitable input/output ports, that may interface with a portable data storage device, or use the interconnect bus 318 for interconnection with a local display 304 and user interface, e.g., keyboard, or the like serving as a local user interface for programming and/or data retrieval purposes. The display 304 may include a touch screen capability to enable users to interface with the system 300 by touching portions of the surface of the display 304. Server and/or ESS operations personnel may interact with the system 300 for controlling and/or programming the system from remote terminal devices via the network 104. The computer system 300 may run a variety of application programs and store associated data in a database of mass storage system 310. One or more such applications may include monitoring and controlling functions associated with charging and discharging energy storage elements of ESS 102.

The components contained in the computer system 300 are those found in computer systems used as servers, workstations, personal computers, network terminals, and the like. As discussed above, the computer system 300 may include one or more applications that provide battery management, battery monitoring, site monitoring, and site management. The system 300 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 300 where system 300 includes Unix workstation, a Windows workstation, a LINUX workstation, or other type of workstation. Other operating systems may be employed such as, without limitation, Windows, MAC OS, and LINUX. In some aspects, the software can optionally be implemented as a C language computer program, or a computer program written in any high level language including, without limitation, Javascript, Java, CSS, Python, PHP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PHP, and so on.

As stated previously, the mass storage 310 may include a database. The database may be any suitable database system, including a commercially available Microsoft Access database and/or a SQL database, and can be a local or distributed database system. The database can be supported by any suitable persistent data memory, such as a hard disk drive, RAID system, tape drive system, floppy diskette, or any other suitable system. The system 300 may include a database that is integrated with the system 300, however, it will be understood by those of ordinary skill in the art that, in other implementations, the database and mass storage 310 can be an external element.

In certain implementations, the system 300 may include an Internet browser program and/or be configured operate as a web server. In some embodiments, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), for example. However, new protocols and revisions of existing protocols may be frequently introduced. Thus, in order to support a new or revised protocol, a new revision of the server and/or client application may be continuously developed and released.

In one implementation, the ESS includes a networked-based, e.g., Internet-based, application that may be configured and run on the system 300 and/or any combination of the other components of the system 100. The ESS 102, server 106 and/or computer system 300 may include a web server running a Web 2.0 application or the like. Web applications running on the server 106 and/or ESS 102 may use server-side dynamic content generation mechanisms such, without limitation, Java servlets, CGI, PHP, or ASP. In certain embodiments, mashed content may be generated by a web browser running, for example, client-side scripting including, without limitation, JavaScript and/or applets on a wireless device.

In certain configurations, the ESS 102 and/or server 106 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The ESS 102, server 106, or another component of system 100 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, and any like public key or private key based schemes. Enhanced security may provide access control to ensure only authorized personnel are able to access and perform operations on the ESS 102. Encryption may be used to protect data being transferred between housing units or via network 104 to server 106.

Figure 4:
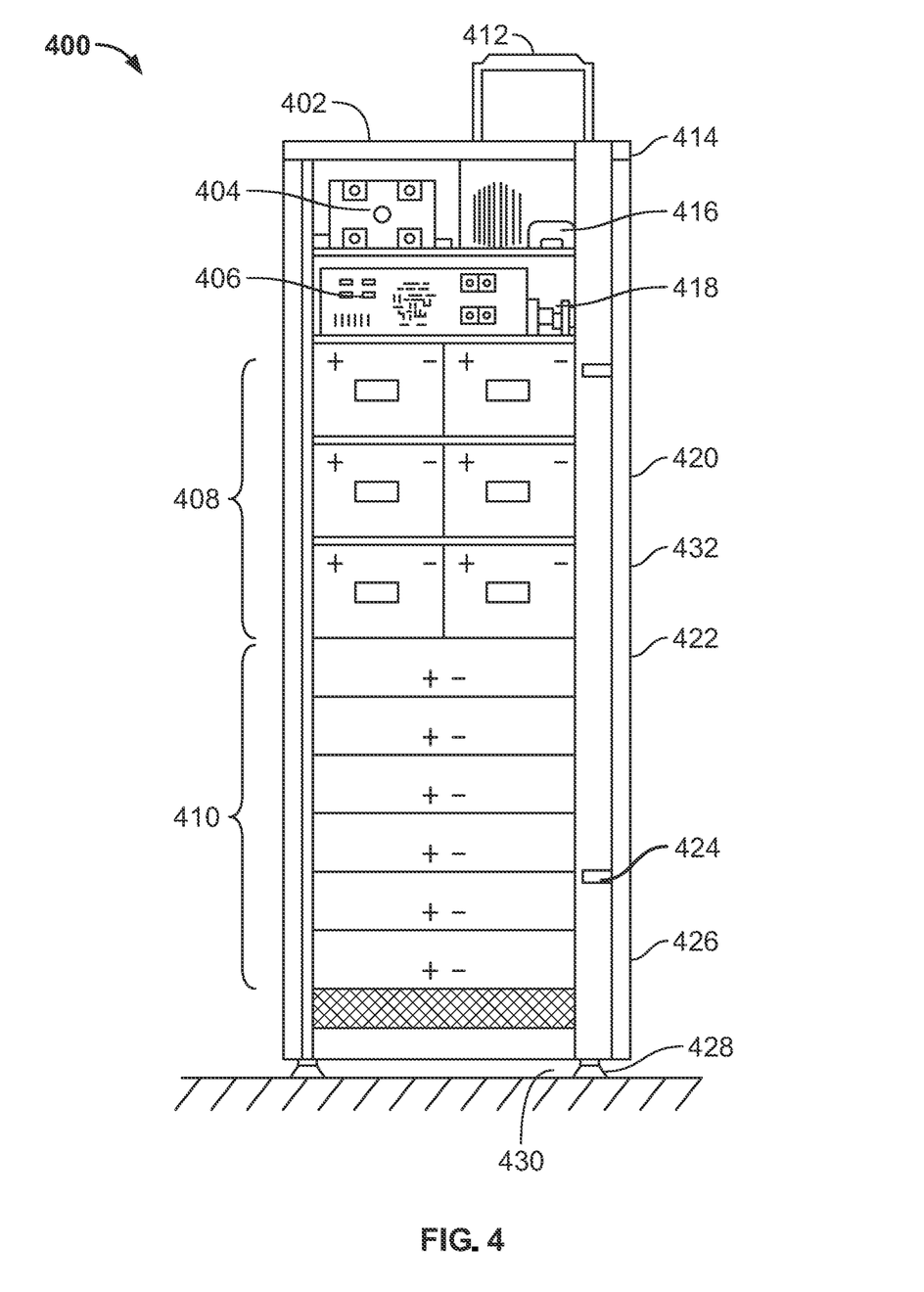
FIG. 4 shows a more detailed view of an energy storage system.

FIG. 4 shows a more detailed view of an energy storage system housing unit and/or enclosure 400. ESS 400 includes a top/rear facing exhaust fan 402, high voltage switch 404, integrated battery management system (BMS) 406, moveable/removable battery module shelf system 408, standard rack mounted equipment shelving 410, low voltage and data service door and/or panel 412, high voltage entire tope service door and/or panel 414, site controller (SC) 416, Human machine interface (HMI) touch screen 420, lock and key 432, zero side displacement hinge/linkage for side by side placement of housing units 422, integrated LEDs for interactive interface 424, serviceable air intake filter 426 adjacent to air intake, adjustable height feet 428, and gasketed doors for flow improvement and port prevention 430. While FIG. 4 illustrates an enclosure 400 with numerous components, any one or more of the components may be removed and/or excluded from enclosure 400 depending on the expected function of the enclosure 400, while additional components may be added. Enclosure 400 is configurable to change its configuration depending on, for example, the form factor of battery modules. If the type of battery is changed, the shelf system 408 may be adjusted in height and/or spacing to properly support the form factor of the new battery type. The size of the shelf system 408 may be increased or decreased depending on the number of batteries that enclosure 400 holds. If enclosure 400 is intended to function as a master unit that controls other housing units, it may include a BMS 406 and SC 416. If enclosure 400 is intended to function as an auxiliary battery housing unit, enclosure 400 may not include BMS 406 and SC 416. Instead, that space may be reconfigured to support additional batteries as part of shelf system 408. Enclosure 400 may be reconfigurable into multiple functional versions depending on the purpose and functions provide by enclosure 400.

Figure 5A:
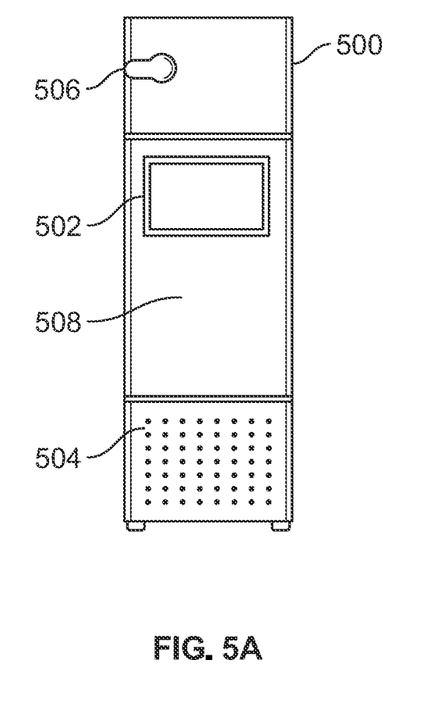
FIG. 5A shows a front view of an energy storage system housing unit.
Figure 5B:
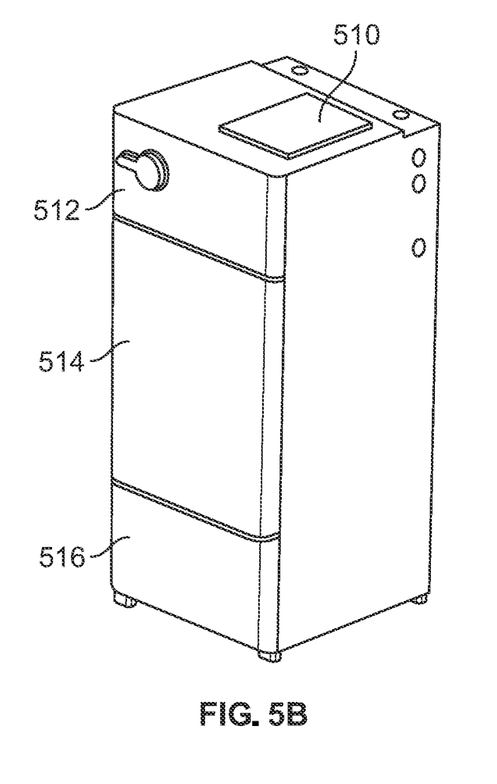
FIG. 5B shows a perspective view of the housing unit of FIG. 5A.
Figure 5C:
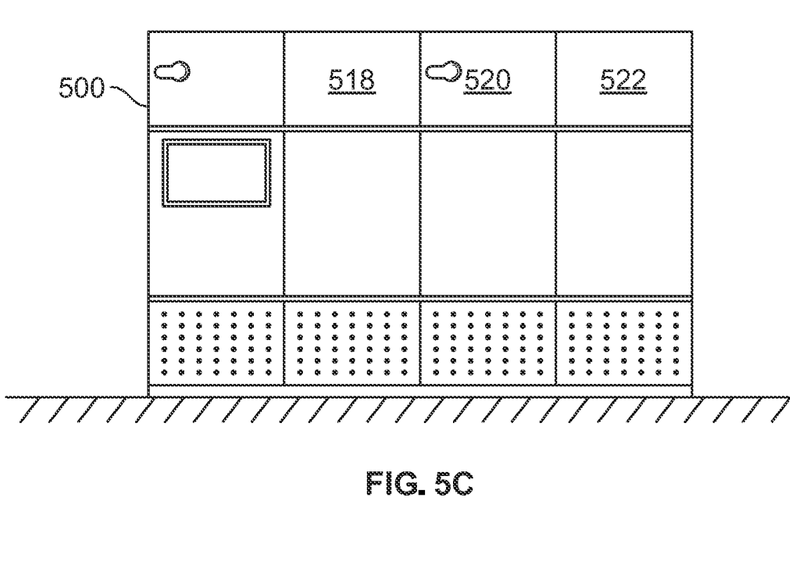
FIG. 5C shows a front view of an energy storage system including four housing units connected in a side-by-side arrangement.

FIGS. 5A-5C shows various views of an energy storage system housing unit 500 in various configurations. FIG. 5A shows a front view of housing unit 500 including an HMI touch screen 502 positioned on a front access panel 508 to enable a user to interface with the system. The front access panel 508 includes an air intake section 504 including multiple perforations to enable air flow into the enclosure 500. The front access panel also includes a latch handle and/or opener 506 to enable a user to open the front access panel. FIG. 5B shows a perspective view of the housing unit 500 of FIG. 5A including a view of a top service door 510. The front access panel 508 may be segmented into multiple sections 512, 514, and 516 that may be separately opened to enable more efficient access to various components. For example, a technician may only need to open section 516 to replace an air filter, only open section 514 to replace a battery, or only open section 512 to service an exhaust fan. FIG. 5C shows a front view of an energy storage system including enclosure 500 connected with three other enclosures 518, 520, and 522 in a side-by-side arrangement. In this configuration, enclosure 500 functions as a master enclosure for auxiliary enclosures 518, 520, and 522.

Figure 6:
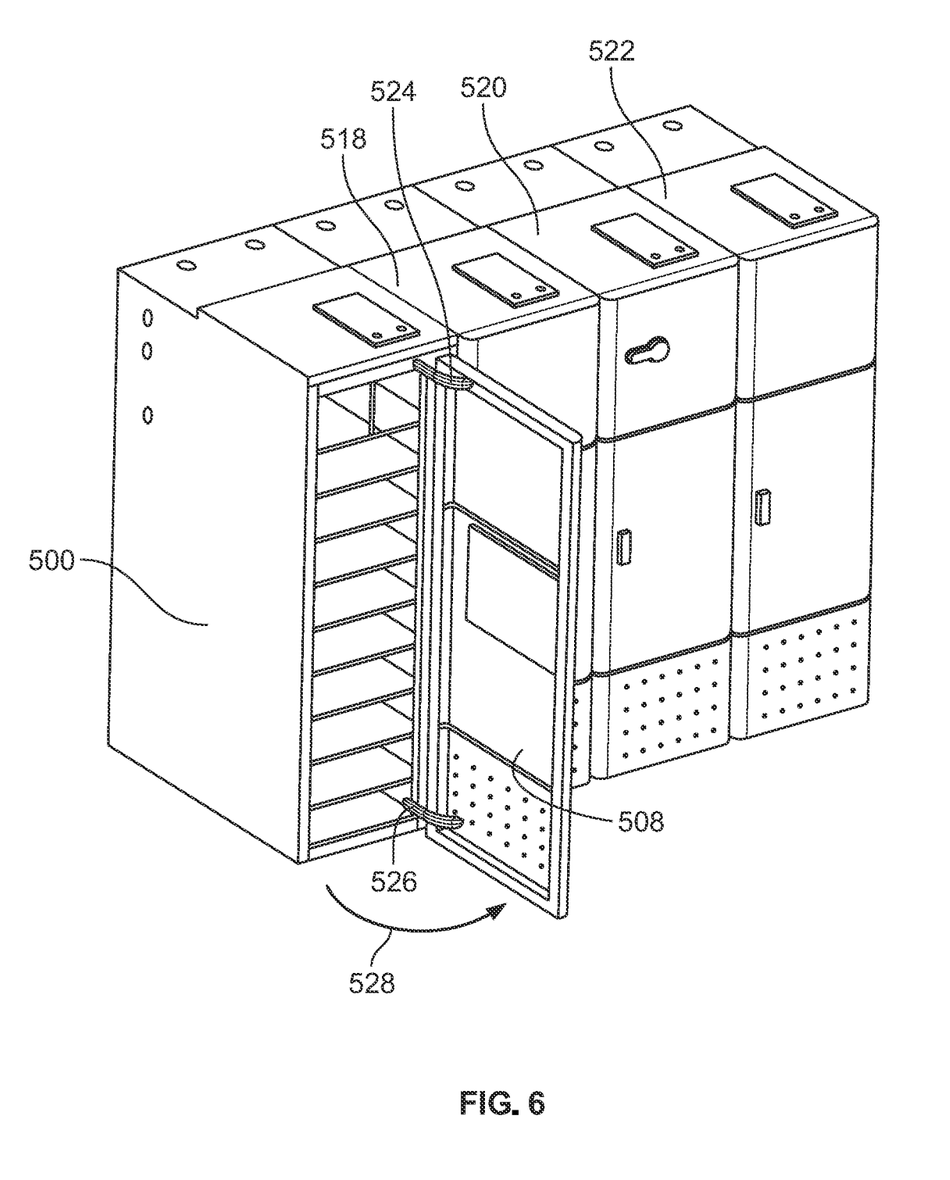
FIG. 6 shows a perspective view of the energy storage system of FIG. 5C with the panel door open in the first housing unit.

FIG. 6 shows a perspective view of the energy storage system of FIG. 5C with the panel door and/or front access panel 508 being open in enclosure 500. FIG. 6 further illustrates the compact arrangement of enclosures 500, 518, 520, and 522, which is enabled in part by hinges 524 and 526 that are arranged to prevent front access panel 508 from extending laterally beyond the side edge of enclosure 500 into enclosure 518 as the panel swings open along radial path 528. Radial path 528 is dependent on a pivot point and/or pivot axis established by hinges 524 and 526. In some implementations, hinges 524 and 526 are arranged such that their pivot axis moves away from and/or shift from the side edge adjacent to enclosure 518 to prevent any portion of the front access panel 508 from contacting adjacent enclosure 508. In some implementations, hinges 524 and 526 are configured to provide no side displacement of the front access 508 toward an adjacent enclosure such as enclosure 518. One such hinge may include, without limitation, at least one of a four-bar linkage hinge, Sarrus linkage hinge, 6-bar linkage hinge, and so on.

Figure 7:
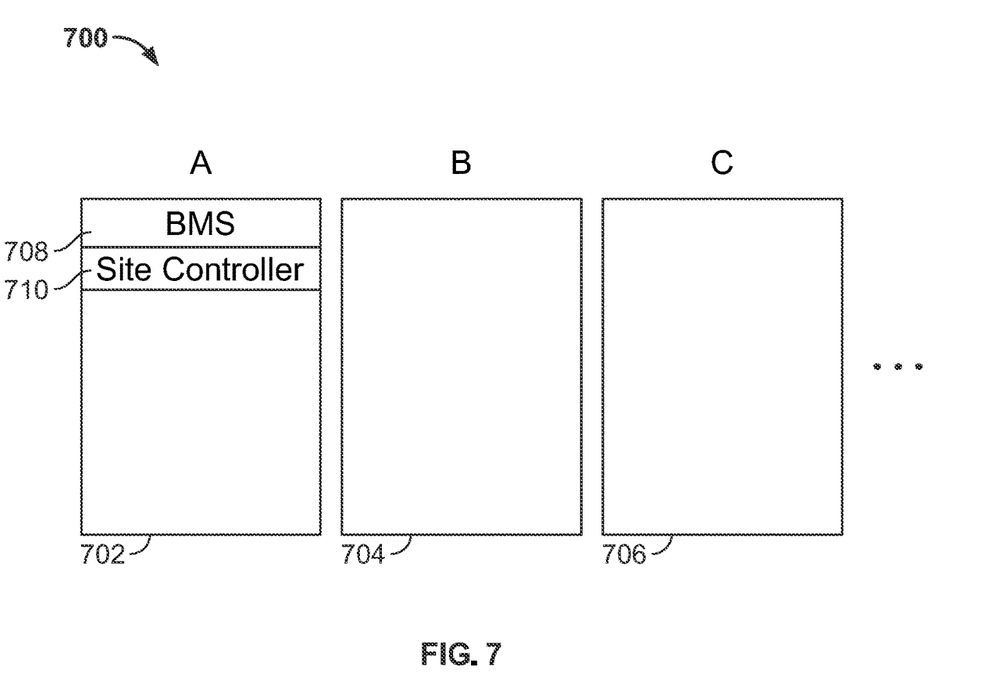
FIG. 7 shows a high voltage configuration of an energy storage system including three housing units.

FIG. 7 shows a high voltage configuration 700 of an ESS including three housing units 702, 704, and 706. In a high voltage configuration, the system may handle voltages above 48 vDC up to or above 1000 vDC. In this configuration, enclosure 702 functions as the master controller for enclosures 704 and 706. Enclosure 702 includes a BMS 708 and SC 710. The BMS 708 may monitor and/or control battery parameters in all enclosures 702, 704, and 706, while SC 710 may interface with other systems on site or remotely to send and/or receive data and/or instructions related to the operation of the system. While only three enclosures are shown in FIG. 7, additional enclosures may be added to scale the capacity of the system.

Figure 8:
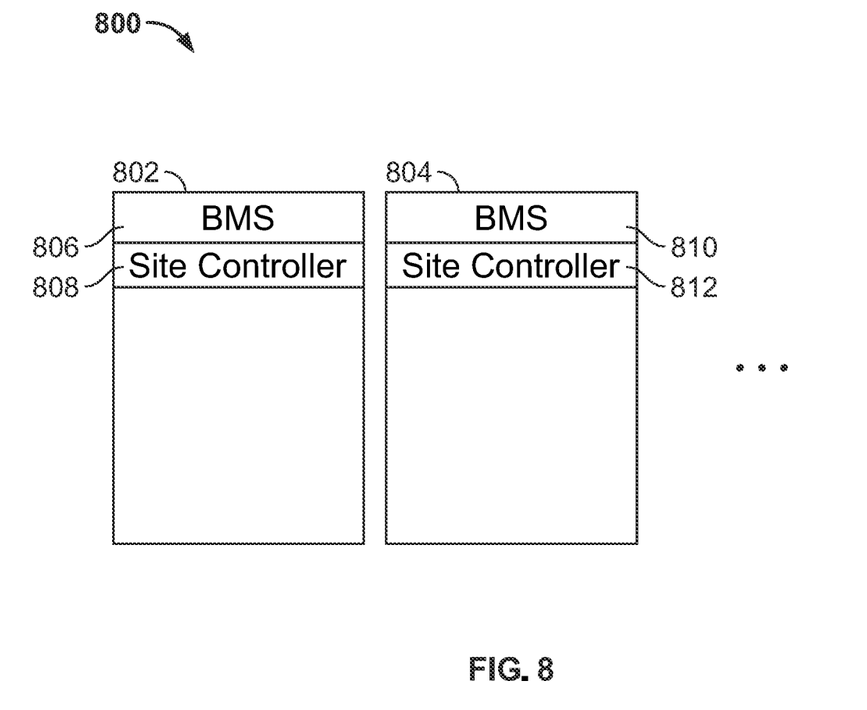
FIG. 8 shows a low voltage configuration of an energy storage system including two housing units.

FIG. 8 shows a low voltage configuration 800 of an energy storage system including two enclosures 802 and 804. A low voltage configuration may handle voltage up to about 48 vDC. In this configuration, enclosure 802 includes BMS 806 and SC 808, while enclosure 804 includes BMS 810 and SC 812.

Figure 9:
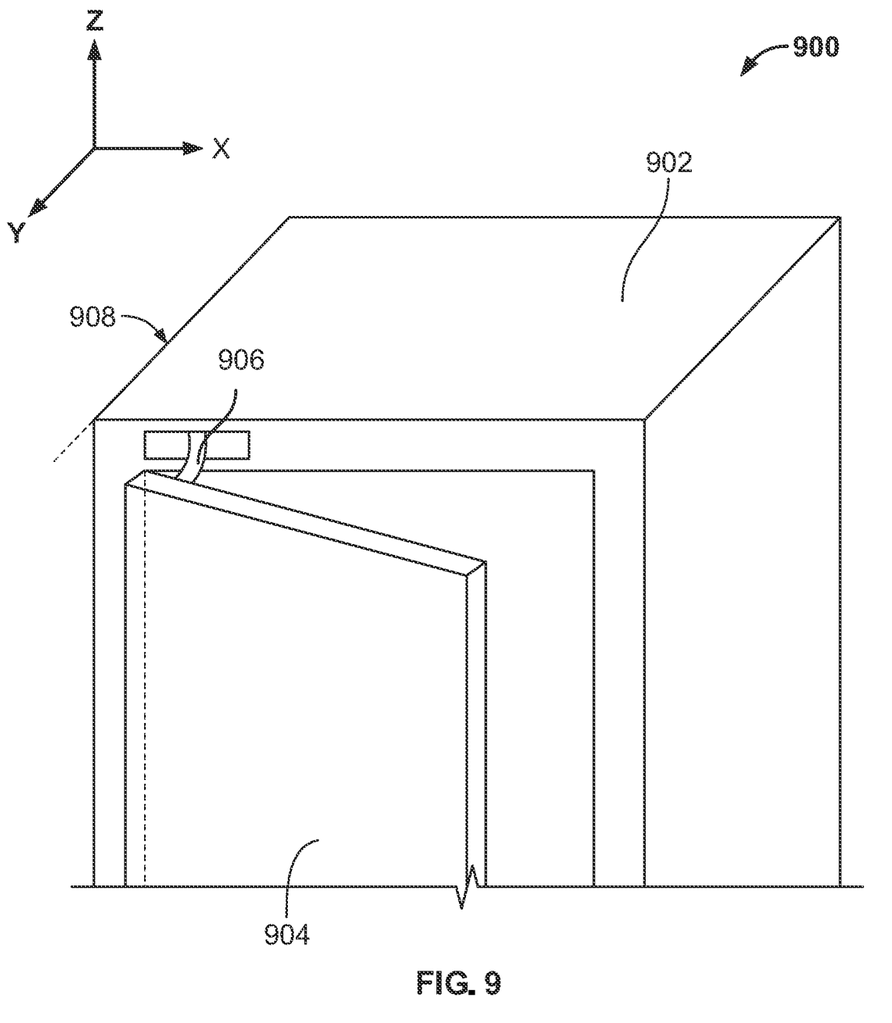
FIG. 9 shows a perspective view of a housing and front panel with a hinge configured to prevent lateral extension of the front panel beyond a side edge of the housing.

FIG. 9 shows a perspective view 900 of a housing 902 and front access panel 904 with a hinge 906 configured to prevent lateral extension or shifting of the front access panel 904 beyond a side edge 908 of the housing 902. In some implementations, hinge 906 is arranged such that its pivot axis moves away from and/or shifts from the side edge 908 to prevent any portion of the front access panel 904 from extending laterally beyond edge 908 and potentially contacting an adjacent enclosure. In some implementations, hinge 906 is configured to provide no side displacement (i.e., displacement along the X axis) of the front access panel 904 toward an enclosure adjacent to edge 908. Hinge 906 may include, without limitation, a four-bar linkage hinge, Sarrus linkage hinge, 6-bar linkage hinge, and so on. By preventing a portion of hinge 906 from extending beyond the edge 908, housing 902 may be positioned more compactly against an adjacent enclosure. As the number of adjacent enclosures increase (as system capacity is expanded), the tighter arrangement significantly increases the power density of the system by enabling a larger number of enclosure to occupy the same physical footprint. Hence, the use of hinges that do not extend beyond a side edge of the housing 900 has a synergistic effect of improving power density and performance of the energy storage system.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. An energy storage system comprising:
   a first housing unit comprising:
      a battery management system arranged to monitor and control operations associated with charging and discharging electrical current from a first storage element, the battery management system being positioned within a cavity of the first housing unit;
      a site controller arranged to coordinate one or more operations of the energy storage system with a component of a power distribution system, the site controller being positioned with the cavity of the first housing unit;
      the first storage element configured to receive one or more first battery cells; and
      a frame defining the cavity of the first housing unit, the frame comprising a first side panel, second side panel, and a front access panel, the front access panel comprising at least one hinge in proximity to the first side panel, the hinge being arranged to prevent a portion of the front access panel from extending beyond an edge of the first side panel as the access panel rotates from a closed position to an open position;
      a first connector element arranged to enable the first housing unit to detachably connect to a second housing unit; and
   the second housing comprising:
      a second storage element configured to receive one or more second battery cells;
      a second connector element arranged to enable the second housing unit to detachably connect, cooperatively with the first connector element, to the first housing unit.

2. The system of claim 1 comprising a third housing unit comprising:
   a third storage element configured to receive one or more third battery cells;
   a third connector element arranged to enable the third housing unit to detachably connect, cooperatively with the second connector element, to the second housing unit.

3. The system of claim 1, wherein the at least one hinge includes at least one selected from the group of four-bar linkage hinge, Sarrus linkage hinge, and a 6-bar linkage hinge.

4. The system of claim 1, comprising at least one sensor arranged to monitor at least one selected from the group of battery temperature, battery current, battery voltage, and housing temperature.

5. The system of claim 1, wherein the battery management system receives sensor data from the at least one sensor and, in response, control an operation of the energy storage system.

6. The system of claim 1, wherein an operation of the energy storage system includes at least one selected from the group of charging an energy storage element, discharging an energy storage element, connecting one or more energy storage elements with other energy storage elements, and disconnecting one or more energy storage elements with other energy storage elements.

7. An energy storage enclosure comprising:
   a battery management system arranged to monitor and control operations associated with charging and discharging electrical current from a storage element, the battery management system being positioned within a cavity of the enclosure;
   a site controller arranged to coordinate one or more operations of the energy storage system with a component of a power distribution system, the site controller being positioned with the cavity of the enclosure;
   the storage element configured to receive one or more first battery cells; and
   a frame defining the cavity of the enclosure, the frame comprising a first side panel, second side panel, and a front access panel, the access panel comprising at least one hinge in proximity to the first side panel, the hinge being arranged to prevent a portion of the front access panel from extending beyond an edge of the first side panel as the access panel rotates from a closed position to an open position.

8. The enclosure of claim 7, wherein the at least one hinge includes at least one selected from the group of four-bar linkage hinge, Sarrus linkage hinge, and a 6-bar linkage hinge.

9. The enclosure of claim 7, comprising a first connector element arranged to enable the enclosure to detachably connect to a second enclosure.

10. The enclosure of claim 7, comprising a DC/AC inverter arranged to convert DC voltage and current from the storage element to AC voltage and current.

11. The enclosure of claim 7, comprising an AC/DC converter arranged to convert AC voltage and current to DC voltage and current.

12. The enclosure of claim 7, wherein at least one of a DC/AC inverter and an AC/DC converter is integrated with the battery management system.

13. An energy storage system comprising:
a first housing unit comprising:
a battery management system arranged to monitor and control operations associated with charging and discharging electrical current from a first storage element, the battery management system being positioned within a cavity of the first housing unit;
a site controller arranged to coordinate one or more operations of the energy storage system with a component of a power distribution system, the site controller being positioned with the cavity of the first housing unit, wherein the site controller is configured to send a command to a site disconnect switch to modify a power source from the power distribution system to the energy storage system upon detecting loss of power from the power distribution system; and
the first storage element configured to receive one or more first battery cells.

14. The system of claim 13, comprising a second housing unit comprising:
a second storage element configured to receive one or more second battery cells;
a second connector element arranged to enable the second housing unit to detachably connect, cooperatively, to a first connector element of the first housing unit.

15. The system of claim 14, wherein the battery manage system is arranged to monitor and control operations associated with charging and discharging electrical current from the second storage element through first and second connector element.

16. The system of claim 13, wherein the housing comprises a front access panel, the access panel comprising at least one hinge in proximity to a first side panel of the housing, the hinge being arranged to prevent a portion of the access panel from extending beyond an edge of the first side panel as the access panel rotates from a closed position to an open position.

17. The system of claim 16, wherein the at least one hinge includes at least one selected from the group of four-bar linkage hinge, Sarrus linkage hinge, and a 6-bar linkage hinge.

18. The system of claim 13, comprising at least one sensor arranged to monitor at least one selected from the group of battery temperature, battery current, battery voltage, and housing temperature.

19. The system of claim 13, wherein the battery management system receives sensor data from the at least one sensor and, in response, control an operation of the energy storage system.

20. The system of claim 13, wherein an operation of the energy storage system includes at least one selected from the group of charging an energy storage element, discharging an energy storage element, connecting one or more energy storage elements with other energy storage elements, and disconnecting one or more energy storage elements with other energy storage elements.

* * * * *